United States Patent [19]
Casaro et al.

[11] Patent Number: 6,078,120
[45] Date of Patent: Jun. 20, 2000

[54] VACUUM PUMP WITH MAGNETIC BEARING SYSTEM, BACKUP BEARINGS AND SENSORS

[75] Inventors: Fausto Casaro, Turin, Italy; Alain Laager, Péry, Switzerland; Crawford Meeks, Calabasas, Calif.

[73] Assignee: Varian, Inc., Palo Alto, Calif.

[21] Appl. No.: 09/258,673

[22] Filed: Feb. 26, 1999

[51] Int. Cl.⁷ ...................................................... F04B 35/04
[52] U.S. Cl. ..................... 310/90.5; 310/68 B; 417/423.4
[58] Field of Search ............................... 417/354, 423.4; 310/90.5, 68 B

[56] References Cited

U.S. PATENT DOCUMENTS

| | | | |
|---|---|---|---|
| 4,023,920 | 5/1977 | Baechler et al. | 417/354 |
| 4,541,772 | 9/1985 | Becker | 415/90 |
| 4,583,794 | 5/1986 | Takahara et al. | 308/10 |
| 4,652,820 | 3/1987 | Maresca | 324/207 |
| 4,683,111 | 7/1987 | Helm et al. | 376/391 |
| 4,878,813 | 11/1989 | Miki | 417/2 |
| 5,106,273 | 4/1992 | Lemarquand et al. | 417/354 |
| 5,227,948 | 7/1993 | Boon et al. | 361/144 |
| 5,469,007 | 11/1995 | Toyama | 310/90.5 |
| 5,760,510 | 6/1998 | Nomura et al. | 310/90.5 |

FOREIGN PATENT DOCUMENTS

| | | | |
|---|---|---|---|
| 2 246 756 | 5/1975 | France | F04B 19/04 |
| 0 445 691 A1 | 9/1991 | France | F04B 19/04 |
| 2 130 655 | 6/1984 | United Kingdom | F04B 29/04 |

*Primary Examiner*—Nestor Ramirez
*Assistant Examiner*—Burt Mullins
*Attorney, Agent, or Firm*—Bella Fishman

[57] ABSTRACT

A vacuum pump a the magnetic bearing assembly includes the magnetic bearing assembly with rotor position sensors and backup bearings being placed inside the rotatable shaft of the vacuum pump. The sensor placements are independent of the bearing position, so that the respective radial sensors can be at the same axial position as the respective radial bearings, which provides sensors co-location and a space saving within a turbopump housing, in particular, in its axial direction, while sensors and mechanical backup bearings are placed in a better protected area with respect to pumped corrosive gases.

10 Claims, 4 Drawing Sheets

VACUUM PUMP WITH MAGNETIC BEARING SYSTEM, BACKUP BEARINGS AND SENSORS

BACKGROUND OF THE INVENTION

The present invention relates to a vacuum turbopump with bearing assembly and more particularly to the vacuum turbopump with a magnetic bearing system with backup bearings and sensors contained within or inside the shaft of the turbomolecular vacuum pump.

A suitable vacuum pump for which the present invention may be utilized is described in the U.S. Pat. No. 5,238,362 assigned to Varian Associates that is incorporated by reference herein. The vacuum pump described in '362 patent is a turbomolecular vacuum pump having an increased compression ratio which is capable of extending the operating range towards higher pressures. Turbomolecular pumps of this type can utilize magnetic bearings and actively control five degrees of freedom of the rotating pump member. A magnetic bearing system with backup supports inside the shaft has been disclosed in the U.S. patent application Ser. No. 08/858,230 "A Rotatable Assembly for Supporting of the Rotor of a Vacuum pump", which is assigned to Varian Associates, Inc. and the description of the bearing assembly for supporting the rotor of the vacuum pump with hollow shaft is hereby incorporated by the reference.

FIG. 1, FIG. 2 and FIG. 3 show schematically a conventional magnetic support for a rotor of the vacuum pump with different shape of the suspended parts. Reference numeral 10 designates a pumping rotor, 20 is a backup bearing, 30 is a magnetic radial bearing stator, 40 is a stator of an electric motor, 50 is a magnetic axial bearing stator and 60 is a shaft. The rotor shown in FIG. 1 has a cantilever structure, while the rotor shown in FIG. 2 and FIG. 3 have a bell-shaped rotor pumping portion. The bell-shaped rotor allows for location of the rotor's center of gravity between the radial magnetic bearings. This bell-shaped rotor is often used in medium or large size turbomolecular pumps horizontally mounted to reduce or eliminate the radial loads on bearings due to tilting moment.

The magnetically suspended pump disclosed in the U.S. Pat. No. 4,023,920 "Turbomolecular as a Vacuum Pump having a Magnetic-Bearing Supported Rotor", belongs to the type of magnetic support for a pump rotor shown in FIG. 3, wherein the magnetic bearing stators, electric motor stator and backup bearings are positioned inside the bell-shaped rotor. The magnetic bearing rotors and electric motor rotor are located in the bell bore for eliminating the connection between the shaft and the bell-shaped rotor. This design being advantageous in certain respects increases the size of the pump since the magnetic and backup bearings are placed in series along the axis of the rotor shaft.

Therefore, it would be desirable to provide an improved bearing assembly which could be utilized in turbomolecular vacuum pumps with increased compression ratios which provide radial and axial sensing while providing for a smaller system length.

SUMMARY OF THE INVENTION

It is an object of the present invention to provide a vacuum turbopump with an improved active magnetic bearing assembly.

It is a further object of the present invention to provide a vacuum turbopump with a magnetic bearing system with rotor position sensors and mechanical backup bearings inside a rotating shaft of this vacuum pump.

It is another object of the present invention to provide a vacuum turbopump with a magnetic bearing assembly with radial and axial sensors of the rotor displacement which are positioned within the rotating shaft so as not to mechanically restrict relative position of the elements of the bearing assembly.

It is yet another object of the present invention to provide a vacuum turbopump with a reduced length magnetic bearing assembly.

According to one preferred embodiment of the present invention, a magnetic bearing assembly for supporting and maintaining a rotating shaft is contained entirely within or inside a portion of a vacuum turbopump body. The rotating shaft is disposed coaxially within the turbopump body. A supporting post with a bore is disposed coaxially within an interior of the rotating shaft. The magnetic bearing assembly includes radial and axial sensors with respective number of radial and axial actuators. The radial and axial sensors are contained within the bore of the supporting post. The sensors are mounted on the supporting post having the axis coaxial to the axis of the rotor and stator of the vacuum pump so that each radial sensor and respective radial actuator are placed in the same cross-sectional plane.

According to another embodiment of the present invention, the magnetic bearing assembly may include mechanical backup bearings which are placed inside the rotating shaft, wherein the dimension of the mechanical bearings are independent of the dimensions of the magnetic bearings.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
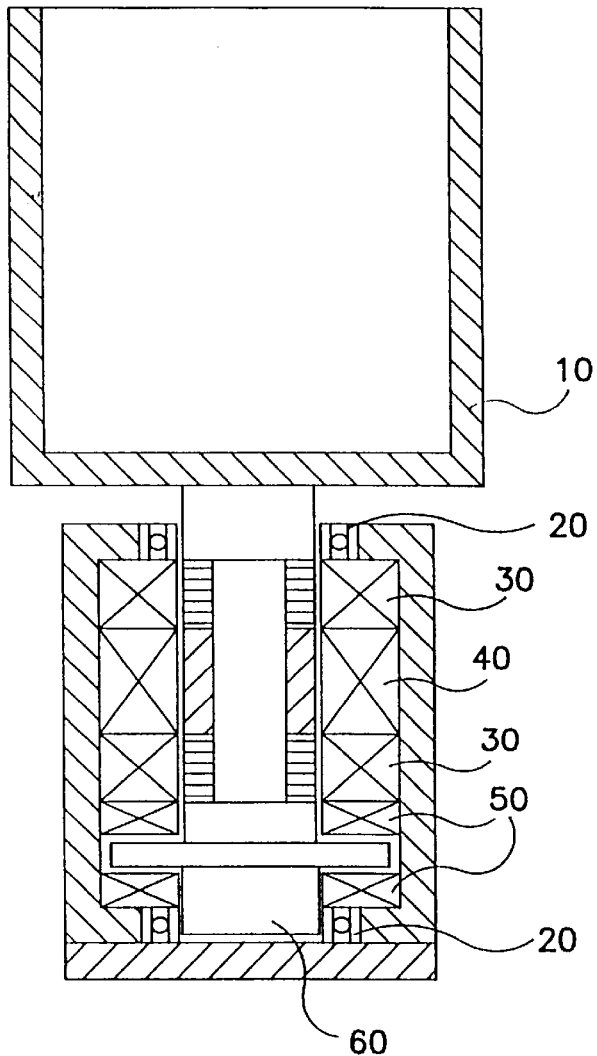
FIG. 1 shows a schematic cross-sectional view of a conventional pump with a rotor having a cantilever structure.
Figure 2:
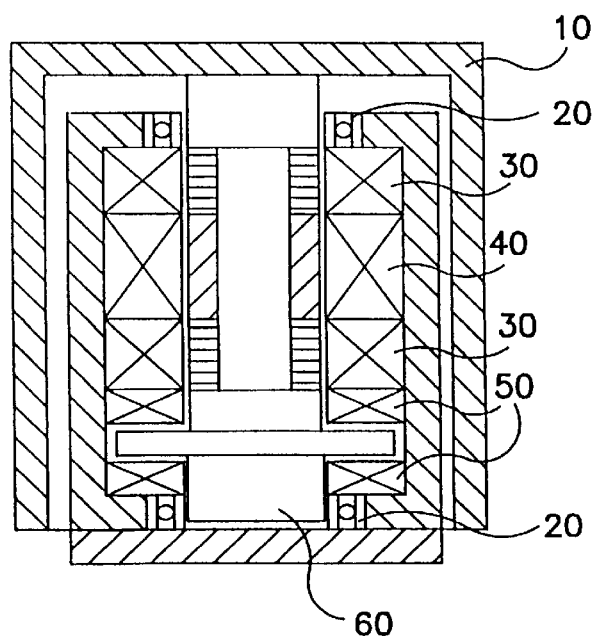
FIG. 2 and FIG. 3 show schematic partial cross-sectional views of conventional pumps with a bell-shaped rotor.
Figure 3:
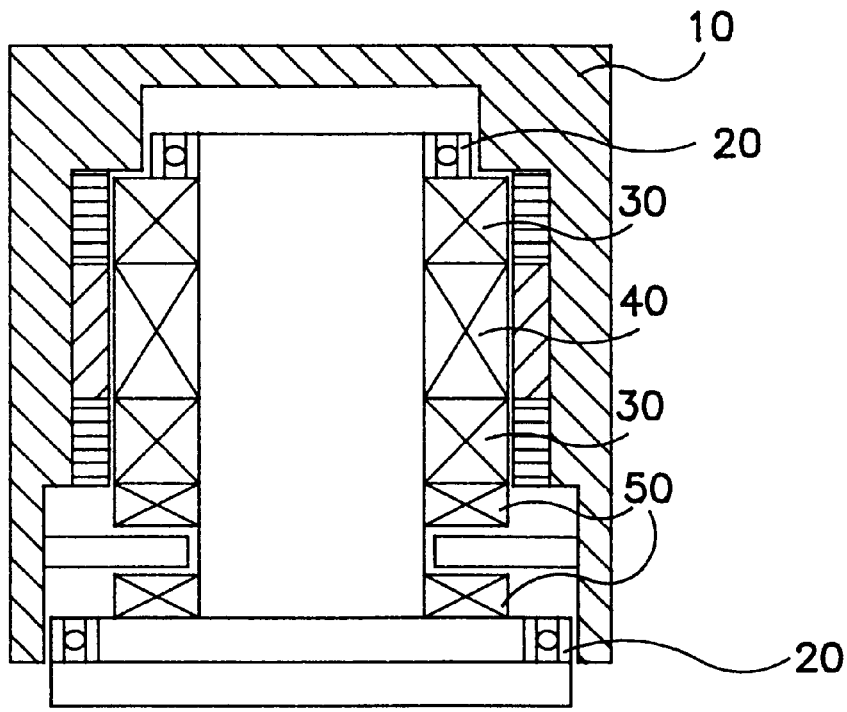
Figure 4:
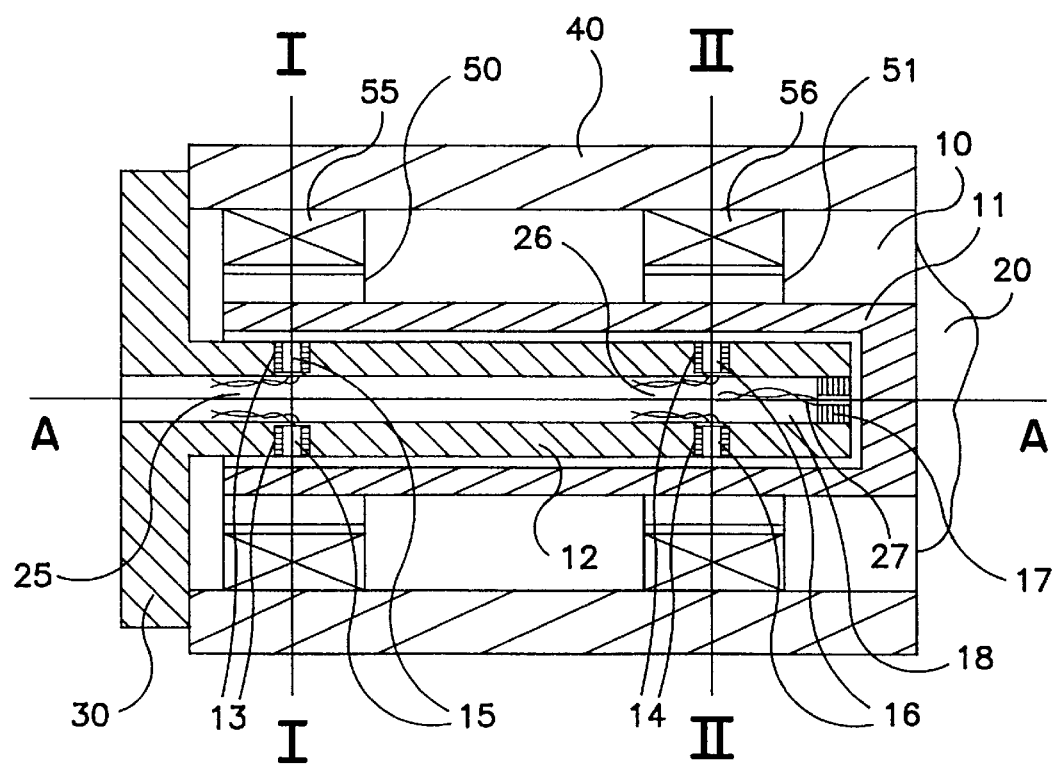
FIG. 4 shows a partial cross-sectional view of a hollow body of a vacuum pump which incorporates a magnetic bearing assembly of the present invention with rotor position sensors placed within the rotor shaft.
Figure 5:
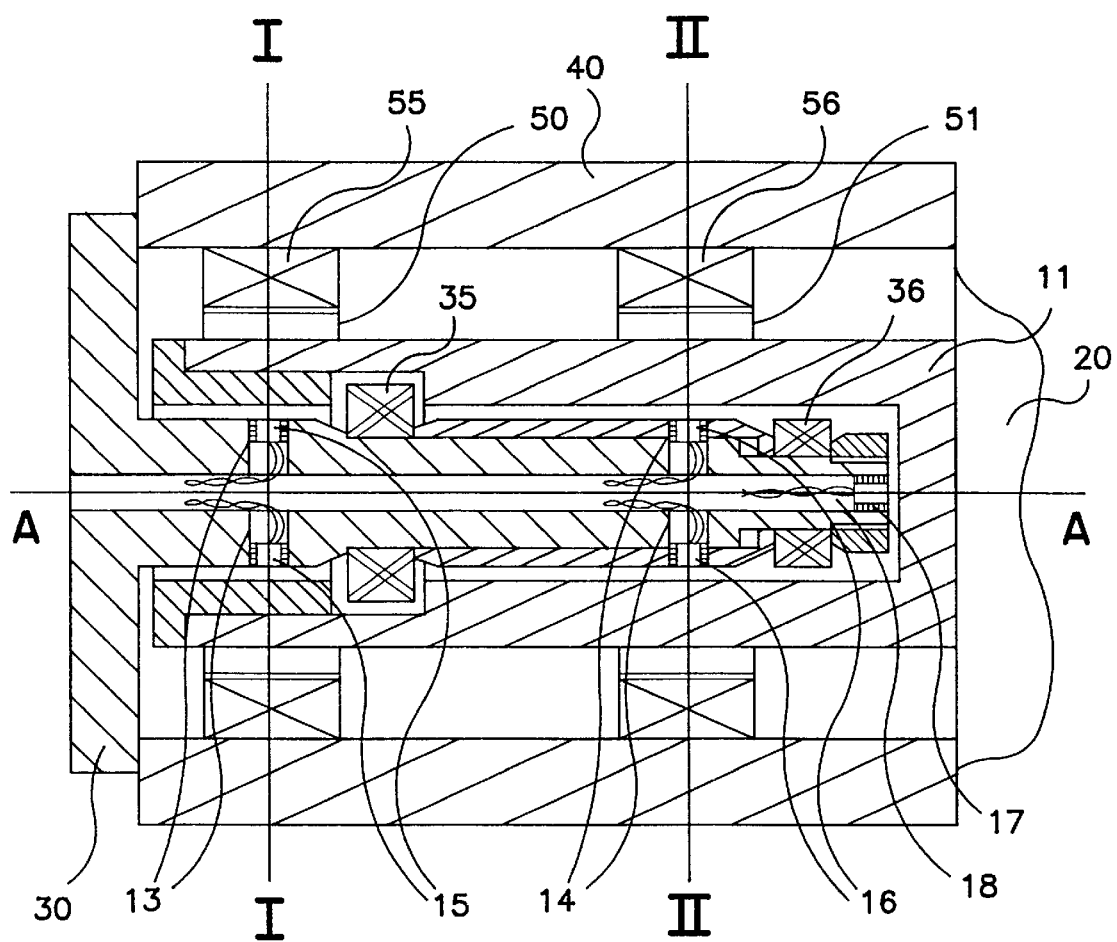
FIG. 5 shows a partial cross-sectional view of the hollow body of a vacuum pump which incorporates a magnetic bearing assembly of the present invention with mechanical backup bearings and rotor position sensors placed within the rotor shaft.

According to one preferred embodiment of the present invention shown in FIG. 4, a magnetic bearing assembly system is contained entirely within chamber 10 of vacuum pump body 40. Rotating shaft 11 is rigidly attached to pumping rotor 20 of the vacuum turbopump. Rotating shaft 11 has a supporting post 12 which is rigidly attached by lower flange 30 to pump body 40. The embodiment shown in FIG. 4 comprises lower radial magnetic bearing rotor 50 and upper radial magnetic bearing rotor 51. Each magnetic bearing has a stationary part and rotating part facing each other. The magnetic bearing assembly comprises at least one radial and/or axial actuators with corresponding number of radial and/or axial sensors contained within or inside rotating shaft 11. Lower radial magnetic bearing rotor 50 and upper radial magnetic bearing rotor 51 are rigidly attached to the shaft 11 and comprise respective radial actuators 55 and 56 which are rigidly attached to the inner wall of pump housing 40. Conventional actuators comprise the electromagnet with control winding adapted for receiving control currents. The electromagnet generates electromagnetic fields which are applied to the rotatable shaft. As shown in FIG. 4 and FIG. 5, lower radial sensors 15, upper radial sensors 16 and axial sensor 17 are positioned within respective a lower and an upper radial bores 13 and 14, and an axial bore 18 in support post 12, coaxial to the axis A—A of the rotor and stator of the vacuum pump. Respective radial sensors 15 and 16 with actuators 55 and 56 are disposed in the respective cross-sectional planes I—I and II—II so as to co-locate the radial sensors with respect to said radial actuators. In the magnetic bearing assembly system according to the present invention, the radial actuators and radial sensors have the same location along the rotor axis. Cables 25, 26 and 27 of respective sensors 15, 16, and 17 are located within the axial bore 18 of supporting post 12.

According to another embodiment shown in FIG. 5, the magnetic bearing assembly system may include a backup bearing assembly contained within the rotating shaft. The mechanical backup bearings are provided within tubular rotating shaft 11 to support pump rotor 20 with respect to vacuum turbopump housing 40 when the magnetic bearing assembly fails or when they are subject to an excessive load. Rotating shaft 11 disposed within chamber 10 formed by a portion of turbopump housing 40 is rigidly attached to pump rotor 20 which is rotating about its axis A—A. The end portion of the rotating shaft is tubular with a cylindrical inner wall. Pump housing 40 has a lower support flange 30. Tubular supporting post 12 is attached to the lower support flange 30 and being coaxial with rotating shaft 11. At least a pair of mechanical backup bearings 35 and 36 are mounted on the outer surface of supporting post 12 so as to provide a gap between the inner wall of rotor shaft 11 and the outer wall of supporting post 12. In FIG. 5, lower mechanical bearing 35 and upper mechanical bearing 36 are positioned to support rotating shaft 11 when magnetic bearings 50 and 51 have failed.

The sizing of the back-up bearings is independent of the sizing of the magnetic bearings. It allows for providing smaller backup bearings for the bearing system of the present invention than in conventional systems. Moreover, the backup bearings of the present invention are nested inside the rotating shaft which allows for their removal and replacement without disassembling other parts of the pump such as the rotor or magnetic bearings.

The description of the magnetic bearing assembly with backup bearings positioned within the hollow rotor shaft is given in greater details in the U.S. application Ser. No. 08/858,230.

When the sensors detecting radial and axial displacement of the rotor are contained within the rotating shaft of the vacuum pump, their placement is not mechanically restricted by the placement of magnetic bearings. Therefore it is possible to dispose the radial sensors at exactly the same axial position as the radial bearings. Such co-location of the radial sensors and the radial bearings provides the sensor measurements which reflect accurately the radial rotor displacement under the radial bearings. Also, there is little or no danger of getting a change of sign in the direction of the measured displacement in regard to the actual displacement at the bearing position. As a result, the rotor radial position measurement becomes more reliable, the control software is simplified and the number of sensors could be reduced. Such an arrangement of the sensors provides space saving within the pump, particularly in the axial direction, because if the sensors would be mounted outside the shaft, the length of the spindle would be increased.

The smaller overall length of the magnetic bearing assembly due to the placement of the sensors within the rotating shaft leads to a shorter rotor size and higher resonant frequencies.

Respective cables 25, 26 and 27 of respective sensors 15, 16 and 17 shown in FIGS. 4 and 5 are separated from the point of origin from the cables for the bearing stators (not shown), which means natural separation of power and signal wiring, which provides a reduction in interference. Also, when inductive type sensors are used, it results in less interference of the bearing electromagnetic field on the sensor signal.

In case of aggressive gases process, this new scheme allows mounting of sensors and backup bearings in protected zone of the pump.

The sensors being contained within the rotating shaft of a vacuum pump provide the above advantages, even if backup bearings were mounted outside the shaft. The feature of measuring the rotor displacement with such a sensor set up is made feasible by the reduction in size of the conventional position sensors employing inductive/eddy current principles or of the optical type.

Having thus describe the illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A vacuum turbopump with a magnetic bearing assembly for supporting and maintaining a rotating shaft disposed coaxially within a chamber formed by a vacuum turbopump housing, said assembly comprising:

a supporting post disposed coaxially within an interior of said rotating shaft and being rigidly connected to said vacuum turbopump housing, said supporting post having at least one radially extending bore and a longitudinally extending bore;

at least a radial and an axial sensor placed within respective radially and longitudinally extending bores in said supporting post for detecting the displacement of said rotating shaft with respect to said supporting post;

at least a radial and an axial actuator placed within said chamber, wherein a number of said actuators corresponds to a number of said sensors; and said radial actuator is positioned in one cross-sectional plane with the corresponding radial sensor.

2. The vacuum turbopump with the magnetic bearing assembly of claim 1, wherein said axial sensor senses an axial position of said rotating shaft with respect to said supporting post.

3. The vacuum turbopump with the magnetic bearing assembly of claim 1, wherein said radial sensor senses a radial position of said rotating shaft with respect to said supporting post.

4. The vacuum turbopump with the magnetic bearing assembly of claim 2, further comprising mechanical bearings, said mechanical bearings positioned in a gap between said supporting post and said rotating shaft.

5. The vacuum turbopump with the magnetic bearing assembly of claim 3, further comprising mechanical bearings, said mechanical bearings positioned in a gap between said supporting post and said rotating shaft.

6. A vacuum turbopump with a bearing assembly for magnetically supporting and maintaining a rotating shaft disposed coaxially within a chamber formed by a portion of a vacuum turbopump housing, said assembly comprising:

magnetic bearings disposed within said chamber;

a supporting post disposed coaxially within an interior of said rotating shaft and being rigidly connected to said vacuum turbopump housing, said supporting post comprising at least one radially extending bore and a longitudinally extending bore; and at least one radial sensor disposed within said at least one radially extending bore in said supporting post for controlling the radial displacement of said rotating shaft with respect to said supporting post.

7. The vacuum turbopump with the bearing assembly of claim 6, further comprising at least one axial sensor disposed within said longitudinally extending bore in said supporting post for controlling the axial displacement of said rotating shaft with respect to said supporting post.

8. The vacuum turbopump with the bearing assembly of claim 7, wherein said magnetic bearings comprise a lower radial magnetic bearing being placed within an end portion of said rotating shaft, and an upper radial magnetic bearing being placed within a top portion of said rotating shaft, and said radial sensors comprise lower and upper radial sensors, said lower sensor and said lower magnetic bearing being placed in one cross-sectional plane, while said upper sensor and upper magnetic bearing are placed in another cross-sectional plane.

9. The vacuum turbopump with the bearing assembly of claim 8, wherein said axial sensor is placed at an end of said supporting post.

10. The vacuum turbopump with the bearing assembly of claim 8, further comprising at least a pair of mechanical bearings said mechanical bearings being placed in a gap between said supporting post and said rotating shaft.

\* \* \* \* \*

UNITED STATES PATENT AND TRADEMARK OFFICE
CERTIFICATE OF CORRECTION

PATENT NO. : 6,078,120            Page 1 of 1
DATED : June 20, 2000
INVENTOR(S) : Casaro et al.

It is certified that error appears in the above-identified patent and that said Letters Patent is hereby corrected as shown below:

[22] Filed: Feb. 26, 1999 change to [22] Filed: Mar. 10, 1998

Signed and Sealed this

Third Day of July, 2001

*Attest:*

NICHOLAS P. GODICI
*Attesting Officer*      *Acting Director of the United States Patent and Trademark Office*